United States Patent [19]

Nordlund

[11] Patent Number: 5,678,977
[45] Date of Patent: Oct. 21, 1997

[54] U-FRAME VEHICLE

[76] Inventor: Karl Signar Napoleon Nordlund, Nyvångsvägen, S-230 41 Klågerup, Sweden

[21] Appl. No.: 492,049

[22] PCT Filed: Jan. 19, 1994

[86] PCT No.: PCT/SE94/00032

§ 371 Date: Jul. 18, 1995

§ 102(e) Date: Jul. 18, 1995

[87] PCT Pub. No.: WO94/16918

PCT Pub. Date: Aug. 4, 1994

[30] Foreign Application Priority Data

Jan. 19, 1993 [SE] Sweden ................... 9300130
Jun. 14, 1993 [SE] Sweden ................... 9302040

[51] Int. Cl.$^6$ ................................. B60P 1/64
[52] U.S. Cl. ................. 414/458; 414/471; 414/476; 414/495; 414/498
[58] Field of Search ..................... 414/458, 471, 414/474, 476, 482, 483, 495, 498, 608

[56] References Cited

U.S. PATENT DOCUMENTS

| | | |
|---|---|---|
| 2,693,288 | 11/1954 | Black . |
| 3,240,506 | 3/1966 | McMullen ............... 414/495 X |
| 3,792,789 | 2/1974 | Oehler ..................... 414/458 |
| 4,015,735 | 4/1977 | Berglund et al. ......... 414/458 X |
| 4,049,143 | 9/1977 | Hatakka et al. .......... 414/458 |
| 4,061,359 | 12/1977 | Metcalfe et al. ......... 414/458 X |
| 4,122,963 | 10/1978 | Berglund et al. . |
| 4,348,149 | 9/1982 | Deamer .................... 414/458 |
| 4,556,356 | 12/1985 | Niva ........................ 414/458 |
| 4,619,578 | 10/1986 | Routledge ............... 414/458 X |

FOREIGN PATENT DOCUMENTS

| | | | |
|---|---|---|---|
| 1278053 | 10/1961 | France | ............... 414/458 |
| 1453288 | 8/1966 | France | ............... 414/458 |
| 2694730 | 2/1994 | France | ............... 414/471 |
| 429629 | 9/1983 | Sweden . | |

*Primary Examiner*—James W. Keenan
*Attorney, Agent, or Firm*—Ladas & Parry

[57] ABSTRACT

A U-frame wagon formed with two parallel longitudinal beams (2, 3) and a front transverse beam (4) interconnecting the two longitudinal beams. Two wheel units (6, 7, 8, 9) are attached to the rear ends of the longitudinal beams for supporting the rear parts of the beams, while the transverse beam (4) is coupled (20) to and supported by a trailing unit. Three connection devices (13, 16) cooperate with complementary shaped connection members of a container platform. Above the wheel units are mudguards, which also serve as lifting devices (10) and these are of rigid construction and extend parallel to the longitudinal frame members. The lifting devices are pivotable around shafts (12) positioned before the shafts of the wheel units, while the connection devices (13) are behind the shafts of the wheel units.

12 Claims, 6 Drawing Sheets

U-FRAME VEHICLE

AREA OF INVENTION

The present invention relates to a wagon or frame intended to be connected to a trailing unit and for carrying and transporting a container. The frame is of U-shape with an open end facing backwards so that the U-frame wagon can be reverse driven for encircling a container at three sides. The U-frame wagon is specifically constructed to be interconnected to a trailing vehicle. The container is of a specific construction adapted for cooperation with the U-frame wagon.

PRIOR ART

Road transports of today are usually performed with trailers between intercity terminals. Such transports take place rather efficient. The terminals comprises loading docks at standardised height, and the large trailers have as a rule loading platforms at the same height so that loading and unloading can take place efficiently.

From the terminals, the transport to the user in the cities inclusive neighbour areas and adjacent countryside, essentially takes place by means of heavier lorries. However, there is a desire to use smaller lorries, but these as a rule do not have efficient equipment for loading and unloading of goods, but loading and unloading must take place manually.

At loading of goods from a heavier lorry, today there is often used a loading bridge adapted at the rear end of the lorry, so called back lifter. In the transport position, the loading bridge is retracted and operates as a door for the rear end of the platform. The loading bridge can be folded to a horizontal position in which it is positioned in line with the floor of the platform, so that goods can be put on the loading bridge from the platform. Furthermore, the loading bridge can be lowered to the ground level so that goods can be loaded further on to the ground or street without heavy lifts for the driver. Such loading bridges are however very dangerous working places and a lot of accidents have occurred in connection with loading and unloading of such loading bridges.

In view of that stated above it is realised that there is a need for a solution to the transportation problem between city terminals and end users, i.e. the last part in the distribution chain of the goods (and sometimes the first part). A solution would be to use a container of a smaller size, which could be transported by smaller lorries, so called satellite lorries.

Moreover, there is required a solution to the problem of loading and unloading smaller lorries or containers transported by such smaller lorries so that loading and unloading can take place without any risk of injuries to the drivers and maybe more or less mechanically.

These problems have previously been attacked by the inventor to the present invention suggesting a lorry built with a front power unit including driver's cabin, engine etc and a rear load carrying unit in the nature of a U-frame, for cooperation with a container. In order to make possible loading and unloading of goods from loading docks of different heights, the container is height adjustable by means of the U-frame.

At loading and unloading a platform of a lorry, the height of the platform will depend on the load of the platform so that when the platform is unloaded, the height will increase and vice versa, due to the spring biasing of the back wheel supporting the platform. Such height alterations during loading and unloading will be inconvenient and the U-frame wagon according to the invention is provided with means for counteracting such alterations of the height of the platform.

In U.S. Pat. No. 4,122,963, there is described a transport vehicle with U-shaped frame which is height adjustable due to the fact that the rear part of the U-frame is foldable. This construction operates rather well but has a few drawbacks, such that the loading of the front wheel axis will be too large at driving with small loads or no loads.

Moreover, Swedish Patent Specification No. 8104988-4, discloses a U-frame truck for transporting a slag melting pot. Due to the specific shape of the melting pot, the construction will be specifically adapted for suiting such a shape. Moreover, there is required only a short operating length for the back lifting cylinders, since they are only to lift the slag pot sufficiently high in order to be free from the ground in the transport position.

DISCLOSURE OF THE INVENTION

The object of the present invention is to disclose a U-frame wagon constructed to support a container for loading goods. The U-frame wagon is provided with means for adjusting the height of the container from a first position close to the ground to an upper predetermined position corresponding to the highest loading dock height commonly occurring. Moreover, the U-frame wagon is provided with a coupling device for coupling to a trailing unit, which can be the front part of a conventional small lorry.

Another object of the invention is to provide a container intended to be used together with said U-frame wagon and essentially comprising a platform having small rims at three sides thereof and connection members for cooperation with said U-frame.

Thus, there is provided a U-frame wagon comprising beams adapted in the shape of a U, two wheel units adapted at the rear end of the U-frame wagon and provided with mudguards and at least three lifting devices for lifting a container positioned inside the U-shaped area.

According to the invention, said mudguards are said rear lifting devices and are intended to lift the rear part of said container via connection devices, and that a front lifting device is adapted to lift the front end of the container, between a lower position in contact with the ground to a transport position and further to an upper position, whereby the loading and unloading position for the container can be anywhere between the highest and the lowest position. Preferably the U-frame wagon comprises two essentially parallel longitudinal frame members a front transversal frame member interconnecting the longitudinal frame members adjacent the front ends thereof for forming a U-shaped open area there between, wheel units at the rear ends of the longitudinal frame members in order to support the rear ends of the frame members a coupling device for supporting the front ends of the frame members, said coupling device being coupled to a trailing unit and at least three connection devices for cooperation with complementary shaped connection members of the container platform, said connection devices being height adjustable in relation to the frame members, whereby two of the connection devices are positioned at the rear ends of each longitudinal frame member. Each rear connection devices is adapted at the lifting device and comprises a beam having U-shaped cross-section and extending parallel to the longitudinal frame member and above said wheel unit and being attached to the longitudinal frame members via a pivotable attachment member. The pivotable attachment member is positioned before the shaft of said wheel unit while the connection device is adapted behind the shaft of said wheel unit.

Preferably, the operations of the U-frame wagon is controlled by a micro processor adapted so that it can take over or correct the operation of the hydraulic cylinders.

The U-frame wagon may include level means for maintaining the U-frame beams at a constant distance from the ground irrespective of the load of the U-frame.

Moreover, there is disclosed a container to be used together with the U-frame wagon and comprising a platform having low rims at three sides thereof, connection members at least at the rear ends of each rim and reinforcement means extending between said connection members at the rear end of the rims. Preferably, the reinforcement means is a steel beam extending transversally over the platform from One connection member at one side of the platform to the other connection member at the other side of the platform.

Further objects and preferred constructions appear from the ensuing detailed description of preferred embodiments of the invention.

SHORT DESCRIPTION OF THE DRAWINGS

The invention is described in more details below with reference to the appended drawings showing several embodiments of the present invention in elucidating purpose.

DETAILED DESCRIPTION OF THE INVENTION

Figure 1:
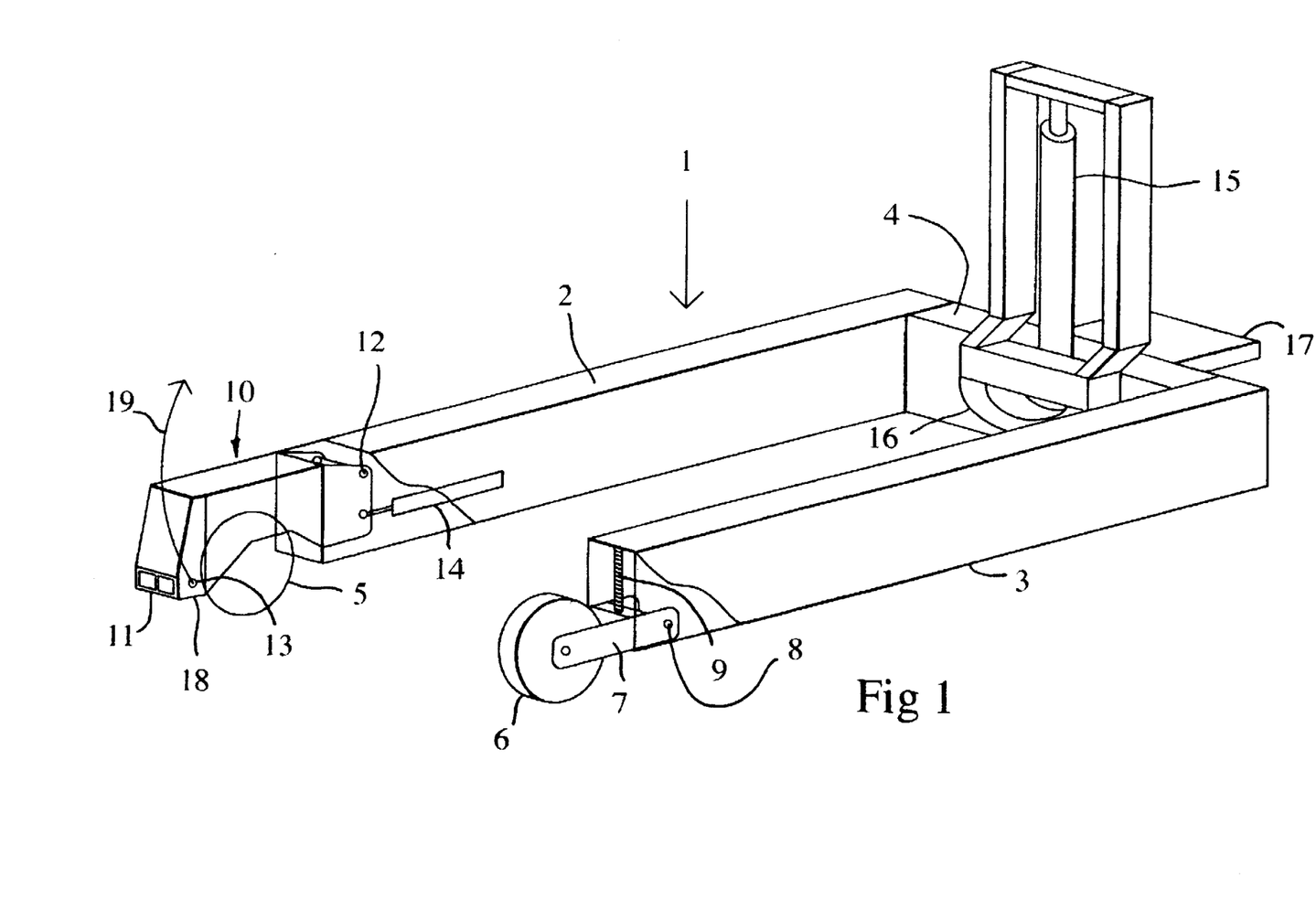
FIG. 1 is a perspective view, partly broken, of a U-frame wagon according to the invention, in which the mudguard over the right back wheel has been removed and the suspension of the left back wheel has been left out.

FIG. 1 discloses a U-frame wagon 1 constructed according to the principles of the present invention and comprising two longitudinal frame beams 2, 3 and a front transversal frame beam 4. The beams are interconnected by means of welds or in any other suitable way for forming a self supporting unit.

Back wheel assemblies 5, 6 are adapted at the back ends of the longitudinal beams 2, 3 while back wheel assembly 5 is partly shown. The back wheel assemblies are attached to the beams in any conventional way. A preferred embodiment is shown in FIG. 1.

Each back wheel assembly comprises two brackets 7 attached to the corresponding longitudinal beam 3 by means of bolts 8 as shown in FIG. 1. The brackets 7 are pivotable around the bolts 8 and are biased in the downward direction, e.g. by a heavy spring 9. The back wheel 6 is attached to the outer ends of the brackets so that the back wheel is supported by the brackets on either side of the wheel. The back wheel assembly 6 is provided with a brake device and hydraulic lines for the brake device in a conventional way. Such hydraulic lines extend forwards inside the beam 3 to a power and control unit.

Such a back wheel suspension is preferred since it involves less torque stresses at the longitudinal beams 3 since equal forces are transmitted by each bracket 7. It will be more difficult to exchange the back wheel when it becomes flat, but the outer bracket may be removable by means of bolts (not shown).

Of course, other back wheel suspensions can be used according to the invention.

Normally, back wheels are protected by back wheel mudguards, the only operation of which is to surround and protect the back wheels and to support back lights, such as brake lights, direction lights etc. Often such mudguards are made of as simple material as possible, sometimes plastics, which however implies that the mudguard is easily broken, since it is very exposed to collisions at reverse driving towards docks and other loading places.

According to the present invention, the back wheel mudguard is constructed in the nature of a lifting device 10, which surrounds and protect the back wheel 5, and supports back lights, direction lights 11 etc. The lifting device 10 is attached to the rear portion of the longitudinal beam 2, by means of a shaft or bolts 12, so that the lifting device 10 is pivotable to a limited degree.

A connection device 13 is placed at the rear portion of each lifting device 10 and facing inwards against the U-shaped area confined by the beams 2, 3 and 4. The connection device is intended for cooperation with a container or similar platform placed in the U-shaped area as described below.

The lifting device 10 is operated by a hydraulic cylinder 14 adapted in the longitudinal beam 2 and before the bolts 12, and cooperating with a portion of the lifting device 10 positioned inside the beam. In FIG. 1 the lifting device 10 is shown in a transport position, but it can be lowered by means of the hydraulic cylinder to a lower position and be elevated to an upper position as shown by arrow 19.

The rear portion of the lifting device 10 can be somewhat chamfered as shown at 18 in FIG. 1 in order to guide the container when operating the U-frame wagon.

At the middle of the front transversal beam 4, there is attached a third hydraulic cylinder 15 with a stroke length of about 1400 mm. At the piston rod of the hydraulic cylinder 15 is attached a yoke, from the ends of which depends a connection device 16 ended by a lug. The lug is intended to cooperate with a hook or similar of a container positioned in the U-shaped area.

Alternatively, according to the invention, a telescopic hydraulic cylinder can be used, which is able to elevate the connection device 16 by about 1400 mm.

At the front end of the transversal beam 4 there is also a coupling device 17 for coupling the U-frame wagon to a suitable trailing vehicle. The coupling is preferably of a rigid type welded to the trailing vehicle but can also be of a detachable type.

It may also be possible to use couplings of the caravan type for coupling to a common car.

The trailing device can be the front portion of a conventional lorry. The trailing device may comprise a motor, front wheels which are possible to turn, and a source of hydraulic pressure. Moreover, the trailing device is provided with brake operators connected to the brake devices of the back wheels.

The U-frame wagon described above is intended to cooperate with a container, which may be a flat platform with rims at three sides, a so called container bottom. The rims are preferably only so high as required for giving the platform a sufficient stability. Such a platform is described below with reference to FIGS. 3 and 4.

The container platform can be made of coal fibres reinforced plastics in order to be as light as possible or of other more conventional materials such as steel or wood. The container platform is completely self supporting and can be dimensioned for loads of about 2000 kg. The container platform can be provided with a number of superstructures as required, such as a cover, higher sides, lashing fittings etc.

Figure 3:
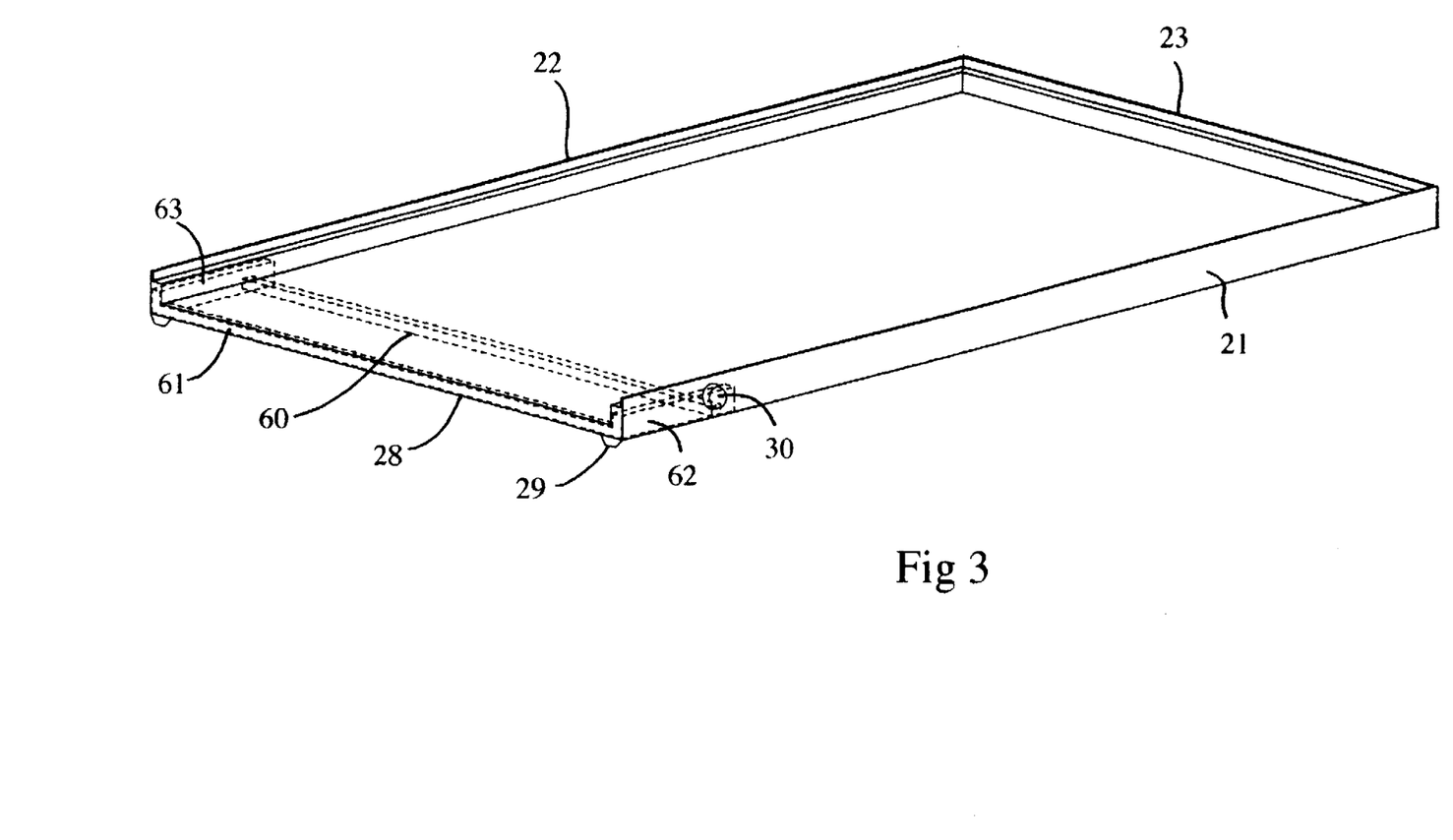
FIG. 3 is a perspective view of a platform according to the invention.

A preferred embodiment of the platform or container is shown in FIG. 3. It comprises a flat loading surface 20 and rims 21, 22, 23 along three sides. The platform is made of reinforced plastics material except a few details as explained below.

The rims may be further reinforced by glass fibre reinforcements. Thus, the platform is a sandwich construction including an intermediate layer 24 of cellular plastics such as DIVINYCELL®, and outer layers 25, 26 of polyester with included glass fibre reinforcement in the nature of a mat or web.

The rims 21, 22, 23 is made in a similar way and is ended by a narrow upper edge 27, which is a connection means for any superstructure of the platform. The upper edge 27 is sufficiently strong for supporting such superstructures. The upper edge can be provided with holes for use of screw fasteners or rivets.

The rear end 28 of the platform is free from such rims, since it is desired to have as low height as possible at the rear end of the platform for making easy the loading and unloading thereof.

The platform can have a width of 2100 mm and a length of 3600 mm. The width of the U-frame beams are each 250 mm, making a total width of 2600 mm. The maximum load at the middle of the platform is 2000 kg giving a deflection downwards of maximum 30 mm.

The platform is provided with feet 29 at the corners and further intermediate positions. The height of the feet is more than 30 mm, usually 50 mm. Such feet will prevent stones or other protrusions at the ground from damaging the bottom side of the platform.

The upper surface of the platform can be provided with a covering of wood laminate for protection thereof.

At the rear end of each longitudinal rim there is a connection member in the nature of a sponge like rod head 30 of stainless steel. The rod head is shown in more details in FIG. 4.

Figure 4:
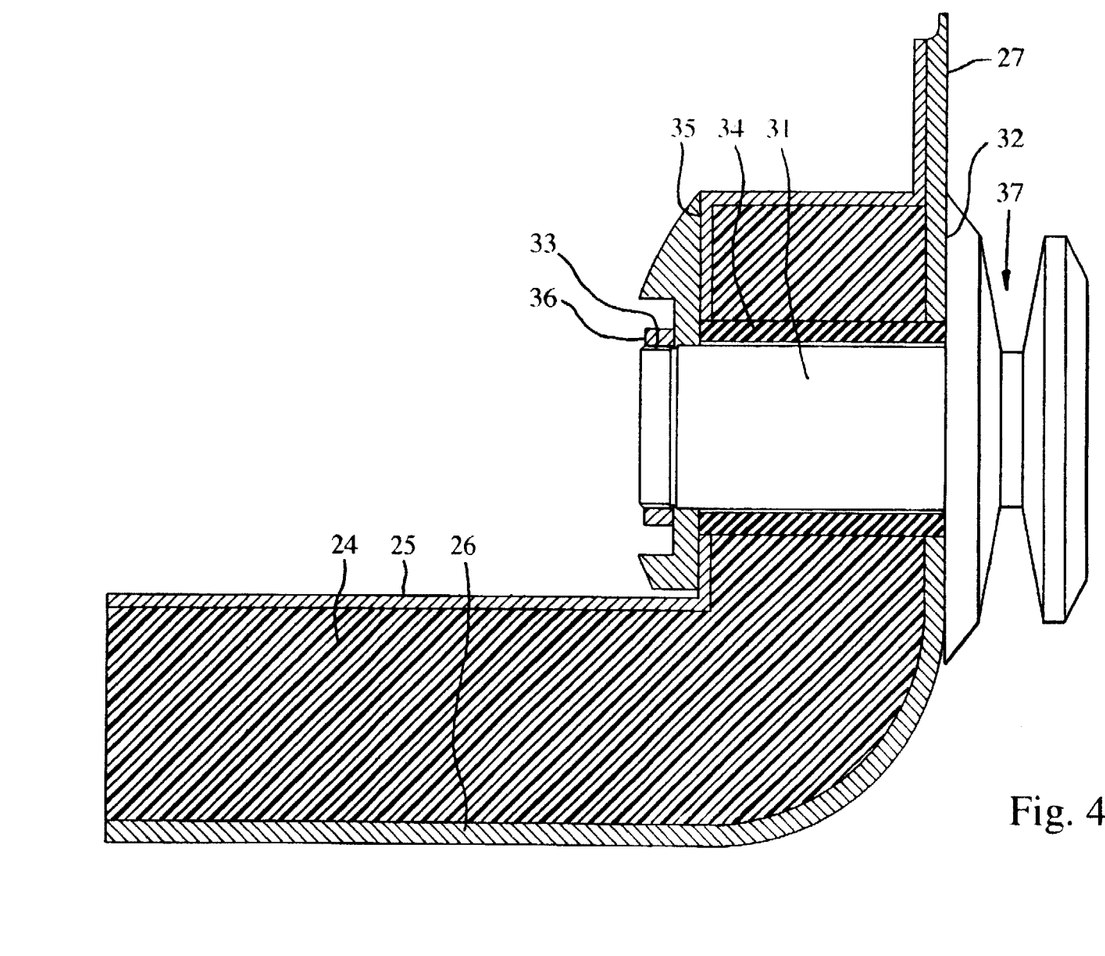
FIG. 4 is a cross-sectional view of a side rim of the platform according to FIG. 3.

The rod head 30 is constructed by a rod 31, the outer end of which being enlarged to a abutment surface 32. The inner end of the rod 31 is threaded at 33. A sleeve 34 is introduced into a hole made in the rim of the platform. The outer end of the sleeve is enlarged into a abutment surface 35. The sleeve 34 and the rod 31 are inserted in the hole of the rim and are interconnected with a nut 36. The distance between the abutment surfaces 32, 35 is determined by the length of the sleeve 34 and it is preferably somewhat shorter than the width of the rim so that a pressure is obtained between abutment surfaces 32, 35 and the rim. A glue can be provided for assisting the attachment.

The outer end of the shaft 31 is shaped as a sponge or a belt pulley having a conical groove 37 with predetermined inner and outer diameters and a cone angle.

The connection member 30 is intended for cooperation with a corresponding connection device of the U-frame wagon. According to FIG. 2, the connection device 40 is a recess 41 having an opening 42 facing backwards forming a C-shaped connection device. Moreover, there may be a locking device 46 as shown by broken lines in FIG. 2.

Figure 2:
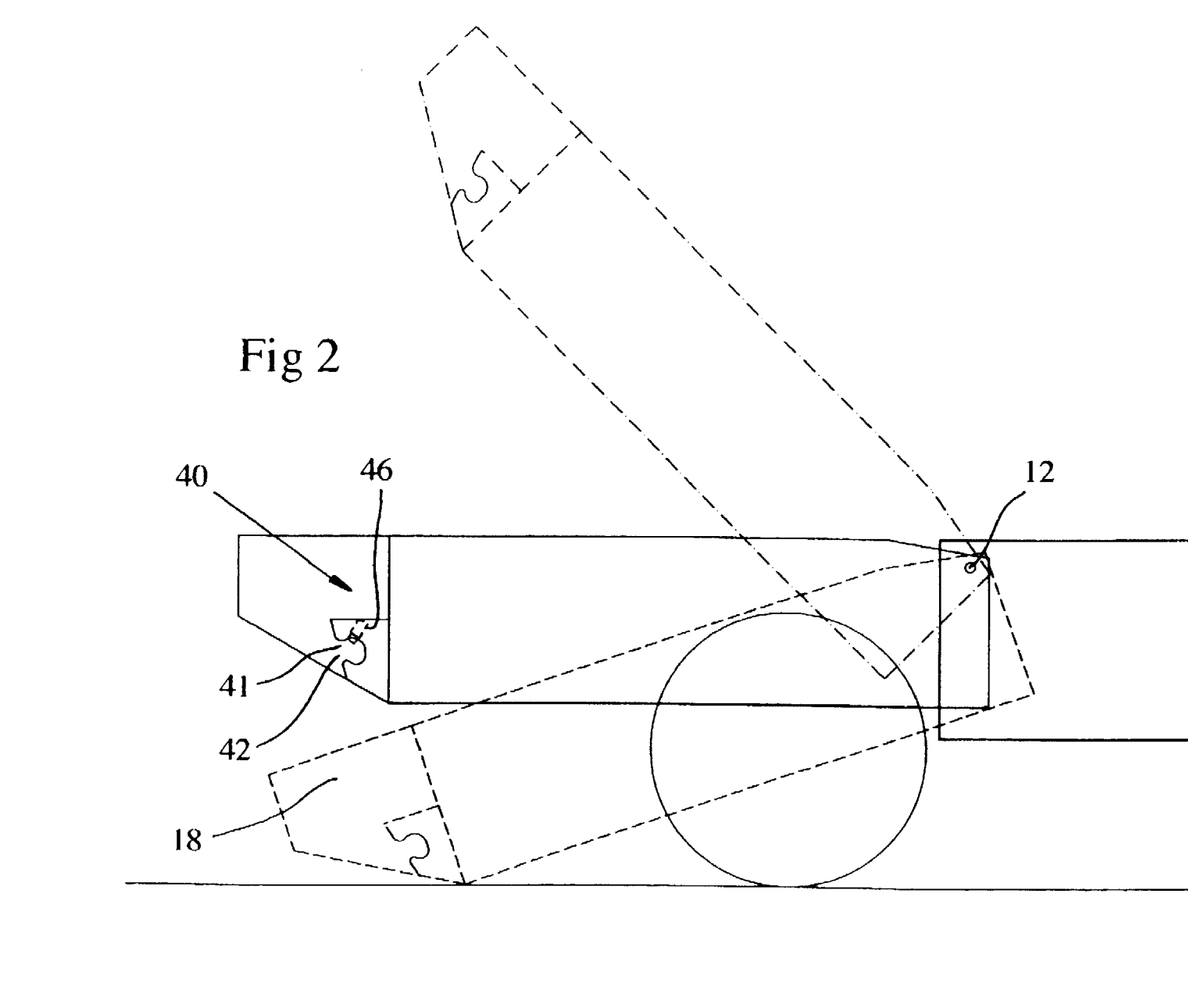
FIG. 2 is an enlarged side view of the loading device according to the invention shown in three different positions.

The operation of the connection device 40 is as follows. The U-frame wagon is reverse driven so that the U-frame encircles the platform. During the reverse driving, the rear lifting devices 10 are placed in their lowest position, in which the connection devices can cooperate with the corresponding connection members of the container standing on the ground. The U-frame wagon is driven until said connection devices cooperate with said connection members of the container. Then, the rod head 30 enters the recess 41 and the same process takes place at each side of the platform.

At the same time, the front connection device of the U-frame reaches the front connection member of the platform, which operates a sensor indicating that the platform is in correct position. The reverse driving of the wagon is stopped and the lifting devices are activated for lifting the platform essentially vertically to the transport position, which can be 350 mm above the ground. The container is always essentially horizontal during the lifting movement, which is important, since otherwise the load can tilt or be offset inside the container.

The lifting movement is over a circular arc. At the front end of the U-frame wagon, there is a guiding and supporting surface 51, which has a shape and dimension so that the front rim of the platform abuts said surface 51 during the lifting movement. Such surface prevents the platform from moving forwards at a braking operation.

At such lifting movement, the connection device 40 is also rotated, which means that the opening 42 will face partly upwards at the transport position, which is advantageous.

When the container is to be loaded or unloaded, the container can be adjusted to different heights, from the ground level to a level of 1400 mm (or the maximum height selected at the construction) in dependence of the height of the loading dock or similar from which the load is to be loaded or unloaded. Also, the platform can be placed at support devices at different heights over the ground.

Figure 6:
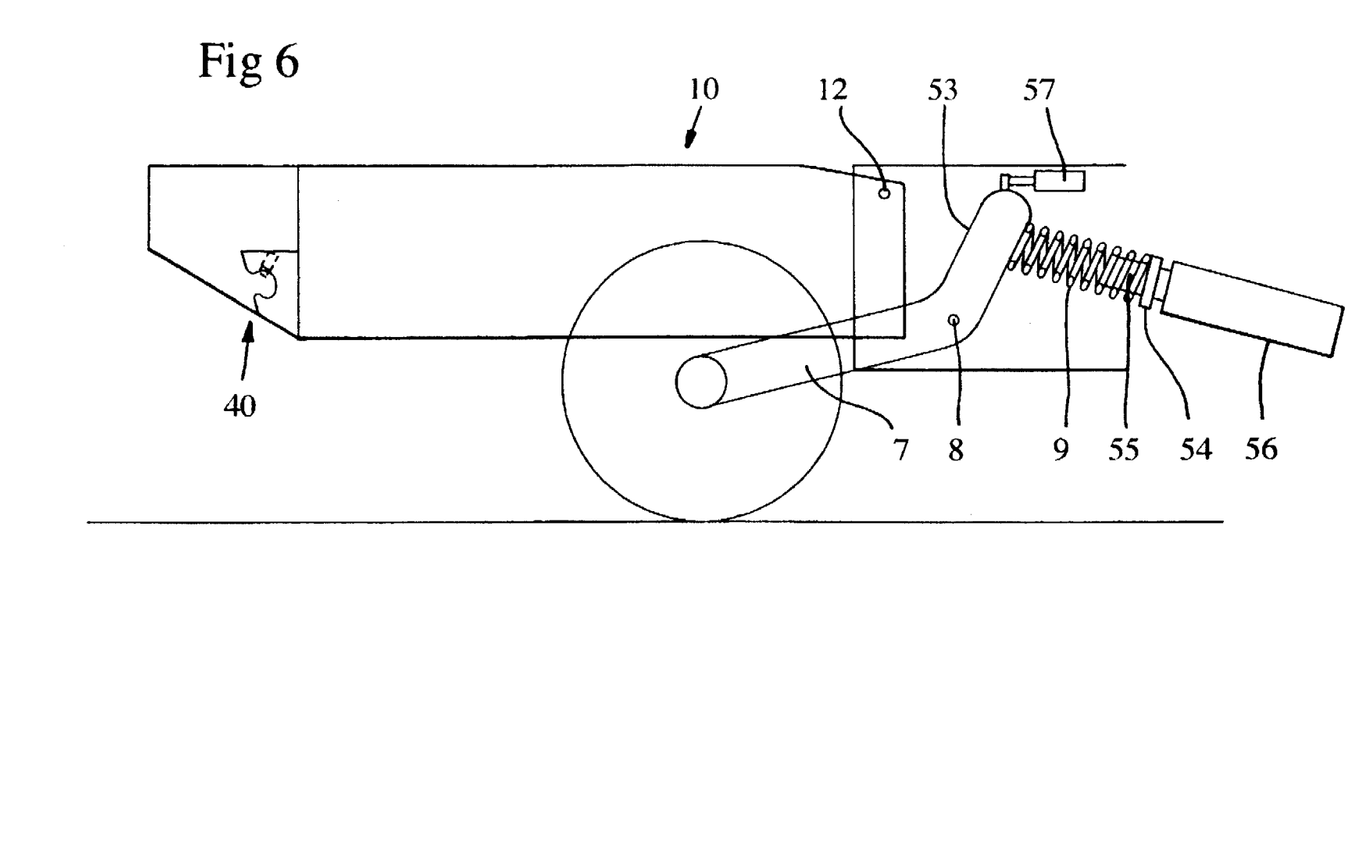
FIG. 6 is a schematic cross-sectional view of a suspension device for the back wheel assembly.

During loading and unloading, the height of the platform will alter during such operation, since the back wheel assembly includes springs. Such movement of the platform can be counteracted by elevating and lowering the platform by said hydraulic cylinders. However, it is more suitable to provide the U-frame wagon with a levelling device keeping the U-frame at a constant height over the ground. Such a construction is shown in more details in FIG. 6. The brackets 7 are bent to form leg 53 inclined upwards as shown. One end of the spring 9 act against said leg 53. The other end of said spring cooperated with a pressure plate 54 attached to the piston rod 55 of a hydraulic cylinder 56. The pressure plate is adjustable and the hydraulic cylinder is controlled by a level indicator 57. If there is a tendency of the U-frame to become lower, the level indicator 57 will be compressed and a signal will be produced to extend the piston rod 55 of cylinder 56 to restore the balance, and vice versa. Such level indicators and adjusters are previously known per se but are very convenient to use in the present application.

Figure 5:
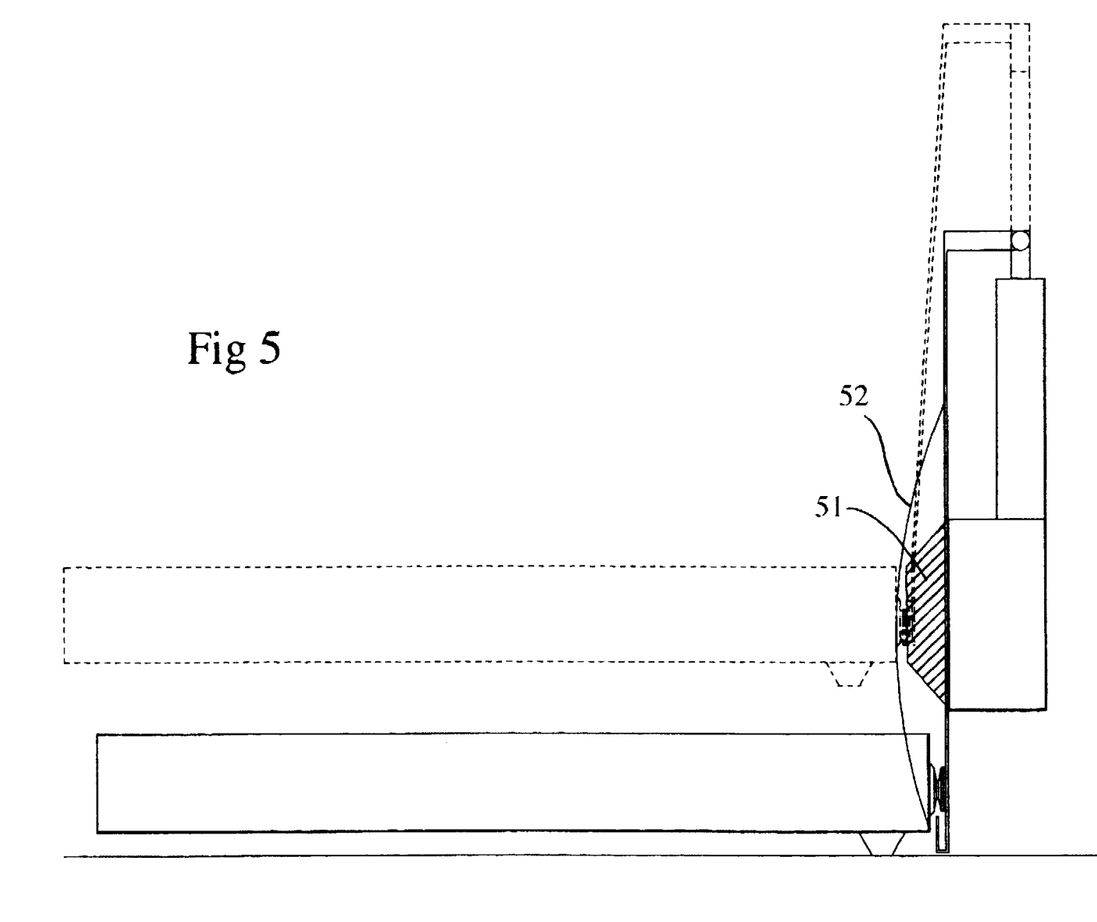
FIG. 5 is a side view of the cooperation between the U-frame and the platform at the front end.

FIG. 5 shows the front connection device according to a preferred embodiment of the invention. Preferably, there are two connection members or rod heads adapted beside each other. The front connection device of the U-frame wagon comprises a U-shaped rail or beam having recesses for cooperation with said rod heads. The platform is lifted over a circular arc as shown in FIG. 5 by arrow 52. The support surface 51 forms a support during transport.

The connection between the connection devices of the U-frame and the connection members of the platform is a keying connection so that the cone surface 37 of the rod heads cooperate with a surface 41 of the connection devices for forming a rigid connection there between. Thus, the platform forms a rigid connection between the rear ends of the longitudinal beams so that a rectangular frame is obtained. Such rectangular frame is stabilised against side forces exerted on the back wheels during driving. Thus, the platform will act as a simulated back shaft interconnecting the two back wheels.

Since the platform transmits side forces between the wheels, it must be constructed to withstand such forces. Thus, the platform is provided with a steel beam included at the rear end of the platform in the plastics. Such steel beam is dimensioned and placed for taking up such forces.

The steel beam can be positioned opposite to the back connection devices and members at the rear end of the platform as shown by dotted lines at 60 in FIG. 3. However, according to a preferred embodiment of the invention, the steel beam is positioned at the very rear end or edge of the platform as shown by dotted lines 61 of FIG. 3. It is desired to construct the platform with as low backside rim as possible, and such a rear steel beam will strengthen the rear edge of the platform.

Such a steel beam 61 can be constructed with forwards extending arms 62, 63 for reaching the connection members. Alternatively such arms 62, 63 are made of plastics as an integrated part of the platform.

It can be desired to provide the platform with electric lighting etc. such as a lamp and other electric equipment. In such a case, the sponge-like connection members can include electric connectors for transmitting electric power to the platform. The left connection member can be the minus pole and the right connection member can be the plus pole of the connectors.

As an alternative, a conventional electric coupling member can be used between the platform and the power source positioned at the U-frame, such as of caravan type.

If the platform is used at flat surrounding surfaces, such as in storage rooms, it can be advantageous to provide the platform with an air cushion so that the platform can be moved by small forces also manually. The platform is provided with a connection member to a source of pressurised air (or is provided with a compressor). Several nozzles are placed at the bottom side of the platform and a curtain is attached depending from the side rims of the platform. Such nozzles are preferably placed at said feet. Said curtain and nozzles form an air cushion below the platform when the pressurised air source is operated.

It is realised that the invention is not limited to the above described combination of connection devices and members but different types can be used.

The advantages of the construction described above are several.

1) The U-frame wagon can be coupled to trailing units of different types of different manufacturers, so that it will not be limited by how a certain car plant believe that their lorries should be constructed. The U-frame wagon can be manufactured to fulfil certain demands of a specific country, while the trailing device can be constructed separately.

2) The container according to the invention can be used as a conventional platform which is loaded and unloaded at site without loosening it from the U-frame wagon. It is also possible to release it from the U-frame wagon so that the container can be pre-loaded at site and then collected and transported to the unloading place by the U-frame wagon. The container can be place at certain supports in order to be positioned in the right loading and unloading height.

3) The container platform according to the invention is adaptable to different demands while it is constructed with minimal height rims and can be provided with desired superstructures. Thus, it can be adapted for use as valuable items transport device and be provided with a strong protective armor be a light cover of woven plastics for loading maximum load weight.

4) A elevating loading bridge at the rear end will not be required but the working place will be much more worker friendly, which decreases injuries of the drivers.

5) The lifting device will resist hard handling which is unavoidable in these applications, since the back wheel mudguards are used as lifting devices and are constructed with a great strength.

6) As few movable pans as possible are used according to the present invention, in principle only two moveable parts.

In order to become free from the back wheels, the lifting device should have essentially U-shaped cross-section. Moreover, the connection device should be positioned as far down and backwards as possible. Furthermore, the pivot shaft 12 should be positioned in front of or before the centre axis of the back wheels.

The lifting device/mudguard 10 is made of a strong U-beam with reinforcements in the nature of framework in order to make the construction light and strong.

The hydraulic cylinder 14 cooperates with the lifting device 10 closer to the bolts 12 than the connection device 13. In this manner, a certain ratio is obtained enabling use of cylinders with short stroke.

The hydraulic cylinders are driven, in a preferred embodiment, by a known valve means of constant flow type. The valve means of the three cylinders are connected to the same shaft, whereby a revolution of this shaft corresponds to a movement of the hydraulic cylinder by a certain distance, independent of the load of the hydraulic cylinder. In this way the three hydraulic cylinders are driven completely synchronously so that the container, resting on the three hydraulic cylinders always is lifted essentially vertically, parallel to the ground.

As appears from that stated above, the rear connection points 13 are moved in a circular path, while the front hydraulic cylinder is moved linearly upwards. In order that the front connection point should not become loose unintentionally, it is necessary that such connection point has a possibility to move backwards and follow the circular movement.

By this pivoting movement, the back connection points will also move more slowly in the vertical plane in the two end positions compared to the mid position, while the front lifting point will move linearly. The difference is not very large but can in certain cases mean that goods on the platform will be offset.

Moreover, it is known that a hydraulic system very well can malfunction. Thus, the hydraulic cylinders and the valves of the system can have leakage or operate less efficient, however without a catastrophic outcome.

In order to manage this case, the hydraulic system is monitored by a micro processor. Each hydraulic cylinder is provided with a position sensor, preferably of electromechanical type, which monitors the position of the hydraulic cylinder. Moreover, there are further position sensors and switches for monitoring other operations. Signals from such sensors etc are transmitted to the micro processor.

The micro processor is preferably a standard type computer or control processor, such as INTEL 88C196KB, which is a 16 byte control processor with integrated A/D-converter in 8 channels (or SIEMENS 80C166 etc). Moreover, there is a large number of digital input and output connections. The position sensors output an analogue electric signal corresponding to the position of each hydraulic cylinder. Such analogue signals are converted to digital signals in the processor and processed according to a control program stored in memory circuits (which can be internal of the processor or external). Thence, the processor outputs control signals, either in digital or analogue form, which are applied to solenoid controlled hydraulic valves, which are connected in parallel with corresponding hydraulic valves. In this manner, the processor can compensate for possible malfunctions of the hydraulic system. A number of additional monitoring operations can be made with help of signals transmitted to the control computer.

The control computer can be used to control the hydraulic cylinders so that all lifting points always move at the same speed. The processor monitors via the position sensors, the positions of the hydraulic cylinders and then operate the solenoid valves which control the outflow and inflow of hydraulic fluid to the hydraulic cylinders. This can in the present case be used for equalising the differences between the pivoting movement of the rear lifting devices and the linear movement of the front hydraulic cylinder. The micro processor counts how much the rear (or the front) cylinders should be compensated in order that the movement should take place synchronously.

The micro processor is programmed for automatically performing the lifting movements. This means that the driver, when he comes to a position for loading goods, operates a switch in the drivers cabin, which defines that the container should be lowered to e.g. ground level. When the driver then goes out from the car, closes the door and walks to the backside of the vehicle, the lowering movement of the container has already started and maybe is ready. Thus, the unloading can take place immediately, without any waiting times. If the loading or unloading should take place from a loading dock, the U-frame wagon could be provided with an infrared detection device detecting the height of the loading dock and automatically adjusting the container to a suitable height. Of course there is possibilities for the driver to adjust the height if it should be unsuitable, which can take place with a remote control of the type used at remote control of a TV set and video set etc. Such automatic adjustment of the height can also take place during the loading and unloading procedure, in order to compensate for any height difference occurring during such loading and unloading.

The micro processor can also be programmed to make it possible to incline the container intentionally, e.g. within ±10°, in order to compensate for the fact that the U-frame wagon is positioned in a small slope. If so is desired it can also include the possibility to tip the entire container by lowering the rear cylinders and elevating the front cylinder.

A specific advantage is obtained if the container is supported in three points. In this way, jamming of the container is prevented if the container should be somewhat tilted in the side direction and then jams and locks against the beam sides of the U-frame. It is of course important that the two rear cylinders are driven synchronously so that the container is normally not tilted.

The micro processor prevents the vehicle from driving when the container is in any other position but the transport position which can be 350 mm above the lowest position. The vehicle can still be moved in the first gear or reverse in a slow speed forwards or backwards for adjusting the position of the container.

It is of course necessary to provide the U-frame wagon with safety devices which operate if the electronics or the hydraulics should fail. Thus, there are four shoulders or rods adapted in connection with the longitudinal beams at the front and rear portions thereof. Such shoulders are spring loaded towards an extended position and can be retracted by hydraulic cylinders and cooperate with corresponding recesses or holes in the side of the container. The shoulders are thus in their normally extended position and the container is supported by such shoulders, also if the hydraulic cylinders do not operate. Of course, the micro processor controls the retraction of such shoulders and prevents the vehicle from starting until such shoulders are extended. The shoulders can also be retracted manually.

Moreover, the longitudinal beams 2, 3 are provided with biasing means operating on the sides of the container from either side during driving. Such biasing means prevents the container from oscillating sideways during driving.

The container is constantly supported by the hydraulic cylinders which makes it possible to weigh the load. The pressure of the hydraulic cylinders is proportional to the load of the container. By measuring such pressure, an indication of the weight of the load is obtained.

An example of using a micro processor is for an automatic billing system. If the U-frame wagon according to the invention is used for transporting goods between different customers, such customers may reside in the memory of the micro processor in the nature of suitable codes. When goods is loaded on the container, the weight of the goods is read by the micro processor by counterbalancing before the loading and reading after the loading. Then, the micro processor monitors how far the goods is transported by reading the trip meter of the vehicle. Finally, the micro processor interconnects the weight and the distance of the transport trip and writes a debit note of the costs of the transport. The debit note is printed on site and left to the customer directly at the delivery of the goods. In this way, advantages are obtained as are immediately realised.

The micro processor can also be used as trip computer.

The micro processor can also be connected to a floppy station so that data can be transmitted to an office computer after the driving of the day and by recording on a diskette, which is then read by the office computer. It is also possible to be in constant contact with an office computer via a modem and car telephone and/or telefax.

By the combination of hydraulics and electronics/computer techniques, such operations can be achieved which are very developed as is realised by a skilled person.

Of course it is realised that the hydraulics can be replaced by pneumatic cylinders or electromechanical devices such as electric motors and screw/nut assemblies.

In the beams of the U-frame, it is plenty of place for spare equipment of different types. Thus, there are hydraulic sources for the powering of the hydraulic cylinders. Moreover, there is a car battery as emergency power source. It can also house fuel tanks etc. Moreover, the lorry according to the invention can be constructed for gas powering, whereby cumbersome gas tanks can be placed in the U-frame beams.

By the fact that the hydraulic and electric power sources are included inside the beams of the U-frame, it could theoretically operate completely independent and separate from the driving unit.

From that stated above, it appears that a U-frame wagon is provided solving the problems mentioned in the introductory portion. The U-frame wagon according to the invention operates in principle independent and together with any trailing unit. Moreover, the container technique developed in connection with long distance transports is used but adapted to the small scale necessary for so called satellite lorries. Finally, the U-frame wagon according to the invention is constructed in the most simple way having merely two moveable parts, the mudguards/lifting devices 10. By the use of modern computer technique integrated with hydraulic technique, a very flexible and reliable solution is obtained, which makes possible several years of problem free use of the U-frame wagon.

I claim:

1. A U-frame wagon for supporting a container platform comprising:

two essentially parallel longitudinal frame members having front ends and rear ends;

a transverse frame member interconnecting the longitudinal frame members adjacent to the front ends thereof for forming a U-shaped open area therebetween;

two wheel units having wheel axes, said wheel units being attached to the rear ends of the longitudinal frame members and including mudguards;

at least one front connection device and two rear connection devices for cooperation with complementary shaped connection members of a container platform arranged in said U-shaped open area;

at least one front lifting device and two rear lifting devices acting upon said connection devices for lifting the container platform between a lower position in contact with the ground, a transport position and further to an upper position;

each rear lifting device comprising a beam member having a front end pivotably attached via an attachment member to the rear end of said longitudinal frame member frontwardly of said wheel axis, and a rear end provided with said rear connection device arranged rearwardly of said wheel axis, said beam member extending above said wheel unit and forming the mudguard thereof.

2. A U-frame wagon according to claim 1 wherein said rear lifting devices are arranged for circular movement by means of hydraulic cylinders, said front lifting device being arranged to move in an essentially linear path by a vertical hydraulic cylinder, and a control device for adjusting vertical movements of said lifting devices to be equal.

3. A U-frame wagon according to claim 2, wherein the operation of the U-frame wagon is controlled by a micro processor controlling the operation of the hydraulic cylinders.

4. A U-frame wagon according to claim 1 further comprising level means for maintaining said frame members at a constant distance from the ground irrespective of the load.

5. A U-frame wagon according to claim 1, further comprising a coupling device for supporting the front ends of the frame members, said coupling device being coupled to a trailing unit.

6. A U-frame wagon according to claim 5, further comprising level means for maintaining said frame members at a constant distance from the ground irrespective of load.

7. A U-frame wagon according to claim 1, further comprising a container platform arranged in said U-shaped open area and having connection members of complementary shape to said connection devices.

8. A U-frame wagon according to claim 7 wherein the container platform is inclinable in the longitudinal direction.

9. A U-frame wagon according to claim 7 wherein the container platform is supported at three points, two rear and one front, and means for driving the rear support points synchronously for avoiding jamming.

10. A U-frame wagon according to claim 7 wherein the container platform further comprises:

rims at three sides thereof connection members adjacent to rear ends of said rims;

reinforcement means extending between said connection members at the rear end of the rims.

11. A U-frame wagon according to claim 10, wherein said reinforcement means is a steel beam extending transversely over the platform from one connection member at one side of the platform to the other connection member at the other side of the platform.

12. A U-frame wagon according to claim 10, wherein said reinforcement means is a steel beam extending transversely over the platform at the rear edge thereof and comprising longitudinal arms extending to said connection members of the platform.

* * * * *